United States Patent Office 2,742,496
Patented Apr. 17, 1956

2,742,496

PROCESS FOR SEPARATING HEXAMETHYLENE DIAMINE SALTS OF ISOPHTHALIC AND TEREPHTHALIC ACIDS

Funston G. Lum and Earl F. Carlston, Richmond, Calif., assignors to California Research Corporation, San Francisco, Calif., a corporation of Delaware No Drawing. Application September 19, 1952,
Serial No. 310,566

7 Claims. (Cl. 260—501)

This invention relates to the production of hexamethylene diamine salts of isophthalic acid and terephthalic acid and mixtures thereof suitable for the preparation of superlinear polymers.

The production of substantially pure salts of isophthalic acid and terephthalic acid or specific mixtures thereof having particular properties constitutes a serious problem. The acids are conventionally produced in the form of their mixtures by the oxidation of crude meta- and paraxylene mixtures, since the isomeric xylenes are exceedingly difficult to separate due to the similarity of their physical properties. The crude isophthalic and terephthalic acid mixtures thus produced are likewise difficult to separate. Conventional methods of separation such as fractional distillation, as applied to mixtures of these acids, are impractical since both terephthalic acid and isophthalic acid have such high melting points that there is always danger of thermal decomposition, and since both acids have a tendency to sublime together. On the other hand, when the mixtures of isophthalic acid and terephthalic acid are esterified with lower aliphatic alcohols to produce liquid mixtures capable of distillation, the boiling points of the isophthalates and terephthalates are found to be so close that the compounds cannot be effectively separated by fractional distillation. Salts of isophthalic acid and terephthalic acid, like the acids themselves and their ester derivatives, have high melting points and closely similar physical properties which render them, in general, equally difficult to separate.

It has now been found that essentially pure hexamethylene diamine salts of isophthalic acid and terephthalic acid can be separated from mixtures thereof by forming an intimate mixture of the salts with a quantity of water insufficient to dissolve all the salts and separating a solid phase and a liquid phase from the mixture.

Upon intimately mixing a hexamethylene diamine isophthalic acid salt and hexamethylene diamine terephthalic acid salt mixture with water insufficient to dissolve all of the salts and separating a solid phase and a liquid phase, essentially pure hexamethylene diamine isophthalic acid salt or hexamethylene diamine terephthalic acid salt, or both, are obtained. When the water is not only insufficient to dissolve all of the salts, but also insufficient to dissolve all of the more soluble hexamethylene diamine isophthalic acid salt, the liquid phase consists of essentially pure hexamethylene diamine isophthalic acid salt in saturated aqueous solution. When the amount of water employed is insufficient to dissolve all of the salts, but is however sufficient to dissolve all of the hexamethylene diamine isophthalic acid salt as well as part of the hexamethylene diamine terephthalic acid salt, the solid phase separated from the aqueous mixture consists of essentially pure hexamethylene diamine salt of terephthalic acid. When the water employed is insufficient to dissolve all of the salts, but just sufficient to dissolve all of the hexamethylene diamine isophthalic acid salt, a substantially complete separation of the mixed salts into essentially pure hexamethylene diamine salt of isophthalic acid and hexamethylene diamine salt of terephthalic acid results.

The solid phase in the above-described latter two separations, which consists of essentially pure hexamethylene diamine terephthalic acid salt, contains some adherent solution of hexamethylene diamine isophthalic acid salt. The amount of hexamethylene diamine isophthalic acid salt solution adhering to the solid hexamethylene diamine terephthalic acid salt is variable and depends on the efficiency of filtration or other means of separation. In a powerful centrifuge, for example, the amount of saturated solution of hexamethylene diamine isophthalic acid salt remaining in the cake of hexamethylene diamine terephthalic acid salt is small. However, even this small amount of saturated solution of hexamethylene diamine isophthalic acid salt must be removed if substantially pure hexamethylene diamine terephthalic acid salt is to be obtained. For this purpose it has been found that washing of the hexamethylene diamine terephthalic acid salt cake with water-alcohol mixtures is very effective. Ethanol-water mixtures in the ratio of about 3:1 by volume are preferred. Even water alone can be employed if an efficient countercurrent washing system with careful control of temperatures and washing rates is used.

Although, as stated above, removal of adherent saturated solution of hexamethylene diamine isophthalic acid salt from the filter cake is desirable for the production of substantially pure hexamethylene diamine terephthalic acid salt, it may sometimes be advantageous to allow the saturated mother liquor to remain in the filter cake. It has been found, for example, that a very useful mixture of hexamethylene diamine salts of isophthalic acid and terephthalic acid containing from 40 to 60% by weight hexamethylene diamine isophthalic acid salt and from 60 to 40% by weight hexamethylene diamine terephthalic acid salt may be obtained as filter cake by filtration without washing. Such a mixture is convertible by heating to linear polyamide type resins suitable for the production of superior synthetic fibers having desirable, more practicable melting points not possessed by fibers from either of the salts alone.

The process of producing essentially pure hexamethylene diamine salt of isophthalic acid and hexamethylene diamine salt of terephthalic acid and specific mixtures thereof in accordance with this invention is adaptable to any mixtures of isophthalic and terephthalic acid hexamethylene diamine salts. Although the hexamethylene diamine salts are particularly suitable and are employed in the preferred embodiment of the invention, other alkylene diamine salts such as the ethylene diamine and tetramethylene diamine salts are also adaptable to the present process. The starting mixtures of hexamethylene diamine salts of isophthalic acid and terephthalic acid may be prepared from mixtures of the acids or their various derivatives according to conventional methods. In the preferred procedure, the mixed isophthalic and terephthalic acids are converted to their hexamethylene diamine salts simultaneously with the formation of the intimate aqueous mixture. This is accomplished by combining the mixed acid with an aqueous solution containing equimolar amount of hexamethylene diamine salts to neutralize the acids and water insufficient to dissolve all of the hexamethylene diamine isophthalic acid salt and hexamethylene diamine terephthalic acid salt thus formed.

As already stated, the amount of water employed in producing the essentially pure hexamethylene diamine isophthalic acid salt and hexamethylene diamine terephthalic acid salt from their mixtures in accordance with the process of this invention may be in any amount insufficient to dissolve all of the salts when the mixture has been brought into equilibrium as by intimate mixing of the solid and liquid phases.

It is possible in accordance with the preferred practice of this invention to effect a substantially complete separation of the mixed hexamethylene diamine salts of isophthalic acid and terephthalic acid into substantially pure hexamethylene diamine isophthalic acid salt and substantially pure hexamethylene diamine terephthalic acid salt in a single operation. In such case, the amount of water employed at the outset is just sufficient to entirely dissolve the hexamethylene diamine isophthalic acid salt present at the temperature selected for filtration, preferably room temperature or about 25° C. This amount is simply determined, for example, by forming a saturated solution of the hexamethylene diamine isophthalic acid salt at the desired temperature. An aliquot portion of this saturated solution is then analyzed by any convenient method. By measurement of the amount of hexamethylene diamine isophthalic acid salt thus obtained from a given amount of solution, the percentage of water based on the hexamethylene diamine isophthalic acid salt present in the mixture to be separated is determined. As the result of such a determination, it has been found that hexamethylene salt of isophthalic acid forms saturated aqueous solutions at 25° C., room temperature, consisting of 50% by weight salt and 50% by weight water. Therefore, the amount of water at room temperature should be equal in weight to the amount of hexamethylene diamine isophthalic acid salt in the mixture to be separated. The amounts of water necessary to form saturated solutions of hexamethylene diamine salt of isophthalic acid at higher temperatures are determinable by similar procedures.

Separations of mixtures of hexamethylene diamine salts of isophthalic acid and terephthalic acid according to the process of this invention may be carried out at any practical temperature. Room temperatures such as about 25° C., as noted above, are particularly convenient.

The solid phase and the liquid phase formed in the process of this invention are conveniently separated by any of the commonly known methods for separating solids from liquids. Such methods may involve sedimentation, including the use of continuous rotating thickeners and centrifuges. Decantation may also be resorted to if complete phase separation is not required. For present purposes, filtration with vacuum or centrifuge has been found to be a very practical means of separation.

Although it is believed that the practice will be clear to one skilled in the art from the foregoing discussion, the following simplified examples are offered as further illustration.

*Example 1*

A mixture of 140 g. of isophthalic acid and 60 g. of terephthalic acid was dissolved in an aqueous solution of hexamethylene diamine consisting of 140 g. of hexamethylene diamine and 238 g. of water. The acids were completely neutralized and the resulting mixture consisted of 102 g. of hexamethylene diamine terephthalic acid salt, 238 g. of hexamethylene diamine isophthalic acid salt, and 238 g. of water, an amount equal in weight to the isophthalic acid salt. The mixture on heating to 80° C. gave a clear solution. On cooling to room temperature the hexamethylene diamine terephthalic acid salt crystallized out readily. About 70% by weight of the saturated hexamethylene diamine isophthalic acid salt solution was removed by filtration, leaving a hexamethylene diamine terephthalic acid salt filter cake with the remaining 30% of the saturated isophthalic acid salt solution adhered thereto. The filter cake was then washed with ethanol, followed by an ethanol-water mixture in a 3:1 weight ratio to remove the adherent hexamethylene diamine isophthalic acid salt solution. The washed filter cake consisted of pure hexamethylene diamine terephthalic acid salt in a yield of 90% by weight of the calculated hexamethylene diamine salt of terephthalic acid in the mixture.

*Example 2*

A mixture of 140 g. of isophthalic acid and 60 g. of terephthalic acid was dissolved in an aqueous solution of hexamethylene diamine consisting of 140 g. of hexamethylene diamine and 238 g. of water. The acids were completely neutralized and the resulting mixture consisted of hexamethylene diamine terephthalic acid salt, 238 g. of hexamethylene diamine isophthalic acid salt, and 238 g. of water, an amount equal in weight to the isophthalic acid salt. The mixture on heating to 80° C. gave a clear solution. On cooling to room temperature the hexamethylene diamine terephthalic acid salt crystallized out readily. About 57% by weight of the saturated hexamethylene diamine isophthalic salt solution was removed by filtration, leaving a hexamethylene diamine terephthalic acid salt filter cake with the remaining 43% of the saturated isophthalic acid salt solution adhered thereto. The filter cake was dissolved in water and treated with decolorizing carbon and filtered, yielding a water-white solution containing a mixture of approximately 50% of hexamethylene diamine isophthalic acid salt and 50% of terephthalic acid salt, which was used without further treatment in high polymer preparation. The high polymer polyamide resin prepared from this mixture had a melting point of about 290° C. The filtrate, consisting of a solution of nearly pure hexamethylene diamine isophthalic acid salt was also treated with decolorizing carbon and filtered, yielding a water-white solution, which was used without further treatment in high polymer preparation. The high polymer polyamide resin prepared from this salt solution had a melting point of about 208° C.

We claim:

1. A process for separating mixtures of hexamethylene diamine salts of isophthalic acid and terephthalic acid which comprises forming an intimate mixture of the salts with a quantity of water insufficient to dissolve all of the salts and separating a solid phase and a liquid phase from the intimate mixture, said solid phase being enriched in hexamethylene diamine terephthalic acid salt compared to the starting mixture, and said liquid phase being a saturated salt solution enriched in hexamethylene diamine isophthalic acid salt compared to the starting mixture.

2. A process for separating mixtures of hexamethylene diamine salts of isophthalic acid and terephthalic acid which comprises forming an intimate mixture of the salts with a quantity of water insufficient to dissolve all of the salts but at least sufficient to dissolve all of the hexamethylene diamine isophthalic acid salt and separating a solid phase and a liquid phase from the intimate mixture, said solid phase being substantially pure hexamethylene diamine terephthalic acid salt.

3. A process for separating mixtures of hexamethylene diamine salts of isophthalic acid and terephthalic acid which comprises forming an intimate mixture of the salts with a quantity of water insufficient to dissolve all of the hexamethylene diamine isophthalic acid salt and separating a solid phase and a liquid phase from the intimate mixture, said liquid phase being an aqueous solution of substantially pure hexamethylene diamine isophthalic acid salt.

4. A process for separating mixtures of hexamethylene diamine salts of isophthalic acid and terephthalic acid which comprises forming an intimate mixture of the salts with a quantity of water sufficient to form a saturated solution of all of the hexamethylene diamine isophthalic acid salt present, separating a solid phase and a liquid phase from the intimate mixture and removing the saturated solution of hexamethylene diamine isophthalic acid salt adhering to the solid phase, the solid phase thus obtained being substantially pure hexamethylene diamine terephthalic acid salt and the liquid phase being an aqueous solution of substantially pure hexamethylene diamine isophthalic acid salt.

5. A process for separating mixtures of hexamethylene diamine salts of isophthalic acid and terephthalic acid which comprises dissolving said mixtures in hot water and cooling until an intimate mixture comprising a solid phase and a liquid phase is obtained and separating said solid phase from said liquid phase, said solid phase being enriched in hexamethylene diamine terephthalic acid salt compared to the starting mixture, and said liquid phase being a saturated salt solution enriched in hexamethylene diamine isophthalic acid salt compared to the starting mixture.

6. A process for separating mixtures of hexamethylene diamine salts of isophthalic acid and terephthalic acid which comprises forming an intimate mixture of the salts at about 25° C. with a quantity of water equal in weight to the amount of hexamethylene diamine isophthalic acid salt present in the mixture, separating a solid phase and a liquid phase from the intimate mixture and removing the saturated solution of hexamethylene diamine isophthalic acid salt adhering to the solid phase, the solid phase thus obtained being substantially pure hexamethylene diamine terephthalic acid salt and the liquid phase being an aqueous solution of substantially pure hexamethylene diamine isophthalic acid salt.

7. A process for separating mixtures of hexamethylene diamine salts of isophthalic acid and terephthalic acid which comprises forming an intimate mixture of the salts with a quantity of water sufficient to form a saturated solution of all the hexamethylene diamine isophthalic acid salt present, separating a solid phase and a liquid phase from the intimate mixture and washing the solid phase with an alcohol-water solution to produce a substantially pure hexamethylene diamine salt of terephthalic acid, the aforesaid liquid phase being an aqueous solution of substantially pure hexamethylene diamine salt of isophthalic acid.

References Cited in the file of this patent

UNITED STATES PATENTS

| | | |
|---|---|---|
| 2,130,947 | Carothers | Sept. 20, 1938 |
| 2,252,554 | Carothers | Aug. 12, 1941 |
| 2,252,555 | Carothers | Aug. 12, 1941 |
| 2,272,466 | Hummel et al. | Feb. 10, 1942 |
| 2,396,248 | Christ | Mar. 12, 1946 |
| 2,516,585 | Pease | July 25, 1950 |
| 2,664,440 | Toland | Dec. 29, 1953 |
| 2,697,723 | Carlston et al. | Dec. 21, 1954 |